US012612083B2

(12) United States Patent
Hois et al.

(10) Patent No.: US 12,612,083 B2
(45) Date of Patent: Apr. 28, 2026

(54) METHOD AND DEVICE FOR INCREASING THE SHARE OF AUTOMATED DRIVING IN AN AT LEAST PARTIALLY AUTOMATED VEHICLE

(71) Applicant: MERCEDES-BENZ GROUP AG, Stuttgart (DE)

(72) Inventors: Joana Hois, Böblingen (DE); Alexander Hanuschkin, Karlsruhe (DE)

(73) Assignee: MERCEDES-BENZ GROUP AG, Stuttgart (DE)

( * ) Notice: Subject to any disclaimer, the term of this patent is extended or adjusted under 35 U.S.C. 154(b) by 124 days.

(21) Appl. No.: 18/570,166

(22) PCT Filed: Jun. 2, 2022

(86) PCT No.: PCT/EP2022/065050
§ 371 (c)(1),
(2) Date: Dec. 14, 2023

(87) PCT Pub. No.: WO2022/263188
PCT Pub. Date: Dec. 22, 2022

(65) Prior Publication Data
US 2024/0278810 A1      Aug. 22, 2024

(30) Foreign Application Priority Data
Jun. 15, 2021      (DE) ..................... 10 2021 003 073.7

(51) Int. Cl.
*B60W 60/00*            (2020.01)
*B60W 50/00*            (2006.01)
(Continued)

(52) U.S. Cl.
CPC .... *B60W 60/0053* (2020.02); *B60W 50/0097* (2013.01); *B60W 50/04* (2013.01);
(Continued)

(58) Field of Classification Search
CPC ......... B60W 60/0053; B60W 50/0097; B60W 50/04; B60W 50/14; B60W 2556/65; B60W 2530/00
See application file for complete search history.

(56) References Cited

U.S. PATENT DOCUMENTS 10,248,196 B2    4/2019  Sisbot et al.
10,518,769 B2    12/2019  Sen et al.
(Continued)

FOREIGN PATENT DOCUMENTS

DE            10335900 A1      3/2005
DE      102012213965 A1 *   2/2014   ............. B60K 28/06
(Continued)

OTHER PUBLICATIONS

English Machine Translation of DE102016214916A1 (Year: 2016).*
(Continued)

*Primary Examiner* — Andrew J Cromer
(74) *Attorney, Agent, or Firm* — PATENT PORTFOLIO BUILDERS PLLC

(57) ABSTRACT

A method for increasing the share of automated driving in an at least partially automated vehicle involves monitoring the conditions for automated driving. The number of manual takeovers by the driver is reduced in order to utilize the advantages of automated driving optimally designed for traffic flow, traffic safety and energy balance, when conditions for automated driving are met, it is predicted by a model that automated driving will be ended by manual vehicle control. In the event that a takeover by the driver is predicted, information is output to the driver which informs the driver that automated driving is reliably in control of the driving situation.

7 Claims, 2 Drawing Sheets

Figure 1:
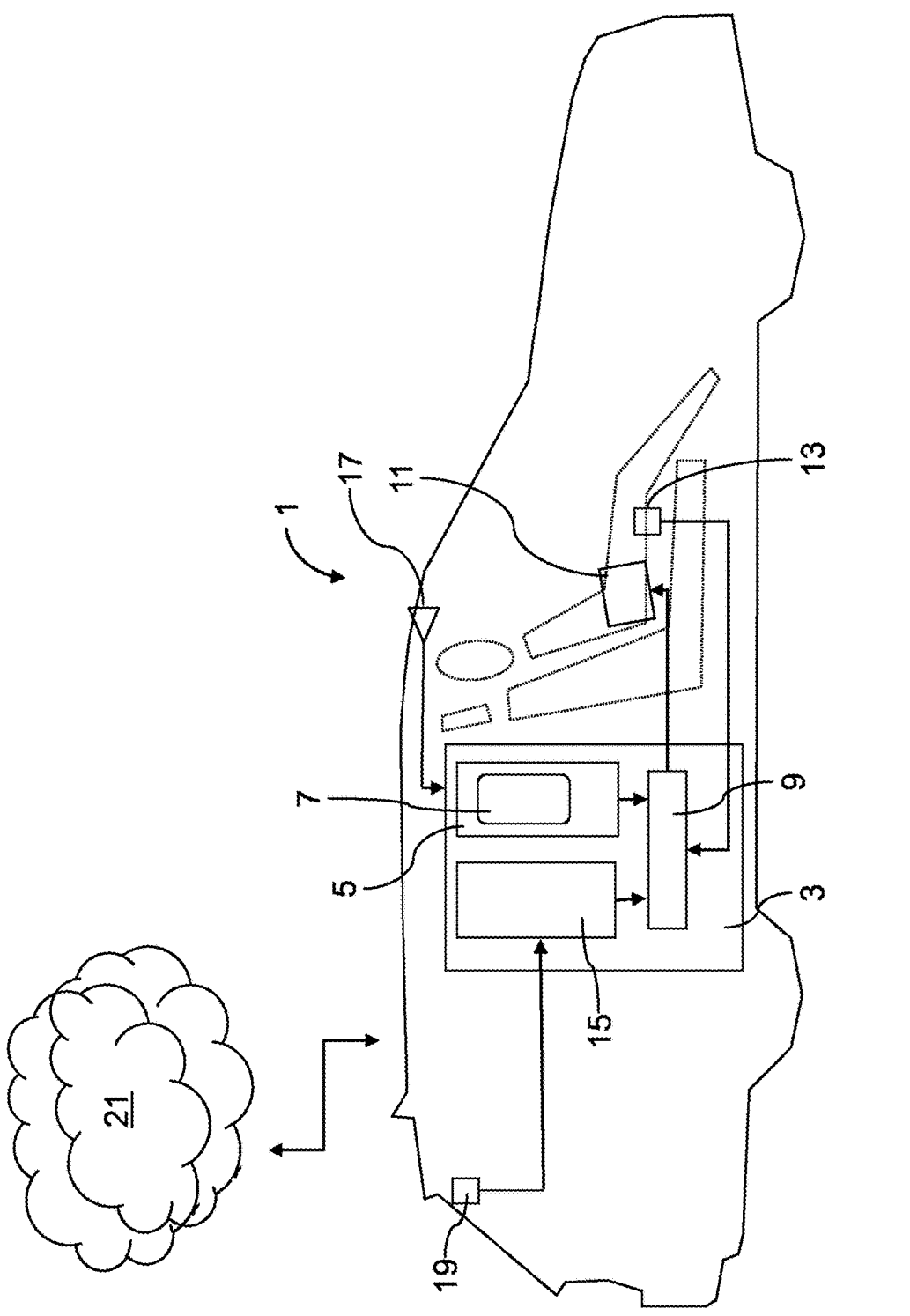

(51) Int. Cl.
  *B60W 50/04* (2006.01)
  *B60W 50/14* (2020.01)

(52) U.S. Cl.
  CPC ......... *B60W 50/14* (2013.01); *B60W 2530/00*
  (2013.01); *B60W 2556/65* (2020.02)

(56) References Cited

U.S. PATENT DOCUMENTS

| | | |
|---|---|---|
| 10,895,465 B2 | 1/2021 | Shimizu et al. |
| 11,267,486 B2 | 3/2022 | Sugiura |
| 11,572,085 B2 | 2/2023 | Oba |
| 2016/0209840 A1 * | 7/2016 | Kim .................. B60W 60/0059 |

FOREIGN PATENT DOCUMENTS

| | | | | |
|---|---|---|---|---|
| DE | 102016214916 A1 * | 2/2018 | ............. | B60K 35/22 |
| DE | 102017212222 B3 | 10/2018 | | |
| DE | 102018130355 A1 | 6/2019 | | |
| DE | 102018126834 A1 | 4/2020 | | |
| DE | 102019101515 A1 | 7/2020 | | |
| DE | 102019203369 A1 | 9/2020 | | |
| JP | 2009103504 A | 5/2009 | | |
| JP | 2016192079 A | 11/2016 | | |
| JP | 2017207967 A | 11/2017 | | |
| JP | 2018032402 A | 3/2018 | | |
| JP | 2018190322 A | 11/2018 | | |
| JP | 2019074518 A | 5/2019 | | |
| JP | 2020203587 A | 12/2020 | | |
| WO | 2019202881 A1 | 10/2019 | | |

OTHER PUBLICATIONS

English Translation DE-102012213965-A1 (Year: 2014).*
Office Action dated Nov. 5, 2024 in related/corresponding JP Application No. 2023-577520.
International Search Report and Written Opinion mailed Sep. 23, 2022 in related/corresponding International Application No. PCT/EP2022/065050.
Office Action created Feb. 28, 2022 in related/corresponding DE Application No. 10 2021 003 073.7.

* cited by examiner

METHOD AND DEVICE FOR INCREASING THE SHARE OF AUTOMATED DRIVING IN AN AT LEAST PARTIALLY AUTOMATED VEHICLE

BACKGROUND AND SUMMARY OF THE INVENTION

Exemplary embodiments of the invention relate to a method for increasing the share of automated driving in an at least partially automated vehicle in which the conditions for automated driving are monitored and to a device for carrying out the method.

DE 103 35 900 A1 discloses a driver assistance system having a module for monitoring the conditions for autonomous driving that is connected to sensors. In partially automated vehicles in particular, it is frequently the case that the vehicle driver manually takes over vehicle control due to their lack of trust or uncertainty. The flow of traffic is thus negatively influenced, which has a disadvantageous effect on traffic safety and the energy balance of the vehicle.

Exemplary embodiments of the invention are directed to a method and a device for increasing the share of automated driving, in which the number of manual takeovers by the driver is reduced, in order to utilize the advantages of automated driving optimally designed for traffic flow, traffic safety and energy balance.

According to embodiments, the method described in the introduction as, when conditions for automated driving are met, it is predicted by means of a model that automated driving will be ended by manual vehicle control, wherein in the event that a takeover by the driver is predicted, information is output to the driver informing the driver that automated driving, i.e., the automated vehicle, is reliably in control of the driving situation. The driver is informed that it is not necessary to take over and switch into the manual driving mode. For example, the model is a trained neural network. The model is, for example, trained in advance by representative drivers, and implemented in vehicles. Preferably, the model is further trained in a personalized manner by individual drivers, such that a manual takeover of vehicle control can be predicted in a manner specific to the driver. The model predicts a manual takeover as soon as the probability lies above a pre-determined value. If manual takeover rarely takes place in a specific driving situation, then the probability is low; if the takeover takes place frequently to always, then the probability is high. The number of manual takeovers of the driving mode by the driver is reduced because the driver's trust in automated driving is increased. Prolonging automated driving increases traffic safety and improves traffic flow.

Advantageously, a functional quality of automated driving is determined by monitoring the conditions for automated driving, wherein in the event that a takeover by the driver is predicted, the information is only output to the driver if the functional quality of automated driving lies above a pre-determined limit value. It is thus guaranteed that the driver is not influenced in their intention to take over the manual driving mode when a functional quality of automated driving is low. To support the driver in their intention to take over, a takeover request can in this instance be triggered by the vehicle.

In one embodiment, in the event of a manual vehicle takeover without prompting and when conditions for automated driving are met, in particular when a functional quality lies above the limit value, the driver is informed of what the driving operating data of hypothetical automated driving would have looked like without a manual vehicle takeover. The driver is thus placed in the position to compare the manual driving maneuver with simulated automated driving maneuvers and to review their decision.

In one variant, the model is trained with data comprising the behavior of the driver, the behavior of the automated vehicle, the driving situations, and/or environmental conditions, such that a time for the driver to take over manual vehicle control without prompting via the vehicle can be predicted. Due to the large quantity of data, the takeover of vehicle control by the driver can be very precisely predicted. In particular, the model is personalized specifically to the driver, stored, and evaluated, i.e., a prediction can always be carried out with a model assigned to the current driver.

In one embodiment, the model is stored on a central server and is trained with data of a vehicle fleet. For this purpose, the drivers of a fleet are classified in terms of their behavior and different models are trained with the data of one classification respectively, which is used as a basis to predict manual takeover by a driver assigned to a driver class.

It is advantageous if the information is output to the driver via function graphics, a voice output, and/or text output. It is thus ensured that the driver is reliably informed of the information depending on the respective information type and depending on the amount of data to be transmitted.

In a further embodiment, by changing the behavior of the automated vehicle, automated driving is adjusted to reduce takeover frequency in the event of a predicted takeover by the driver without being prompted to take over. Driving parameters such as speed or distance are changed iteratively or experimentally or depending on the stored characteristic maps as soon as it is predicted that, due to a correspondingly high probability, a manual takeover will take place. As the training of the model for predicting the manual vehicle takeover is ongoing, the frequency of an actual, and thus also of the predicted takeover and the driver information connected to the latter reduces corresponding to the altered driving behavior of the vehicle. After the behavior of the automated vehicle is changed, the information output to the driver is maintained, such that the information output and the change to driving behavior simultaneously reduce the probability of a manual takeover. In the ideal scenario, as soon as the driver no longer receives information due to the reduced probability of takeover, a manual vehicle takeover no longer takes place in a corresponding driving situation because the driving behavior has changed and the driver's trust has increased. In another variant, after the driving behavior changes, the information output is suppressed, and only activated again as soon as a manual vehicle takeover takes place in the driving situation in question despite the driving behavior changing.

In a further variant, the driving parameters of a vehicle in the automated driving mode that are determined to be effective for reducing takeover frequency are transmitted to other vehicles via the server. This measure can be used whenever the driver frequently ends the automated driving mode via manual takeover without prompting by the vehicle. It serves to further increase the driver's trust in automated driving.

A further aspect of the invention relates to a device for increasing the share of automated driving in an at least partially automated vehicle, comprising a module for monitoring the conditions for automated driving. In a device that reduces the number of manual takeovers by the driver in order to utilize the advantages of automated driving optimally designed for traffic flow, traffic safety, and energy balance, a monitoring module is equipped with a stored model for predicting a driver's intention to end the automated driving by manual vehicle control, wherein in the event that a takeover by the driver is predicted when conditions for automated driving are met, an action unit, i.e., a control device, outputs information to the driver, which informs the driver that automated driving, i.e., the automated vehicle, is reliably in control of the driving situation.

Advantageously, the monitoring module and/or the action module of every vehicle of a vehicle fleet are wirelessly coupled with a vehicle-external server for classifying groups with similar characteristics of transition from automated driving to the manual driving mode. The models trained to different drivers in the vehicles of a fleet can thus be centrally evaluated and output where required to vehicles of which the drivers correspond to one of the classifications.

Further advantages, features and details result from the following description in which—optionally with reference to the drawing—at least one exemplary embodiment is described in detail. Features described and/or visually represented can form the subject matter of the invention in isolation or in any logical combination, in some instances also independently of the claims, and can in particular additionally be the subject matter of one or several separate applications. Identical, similar and/or functionally identical parts are provided with the same reference numerals.

BRIEF DESCRIPTION OF THE DRAWING FIGURE

Figure 2:
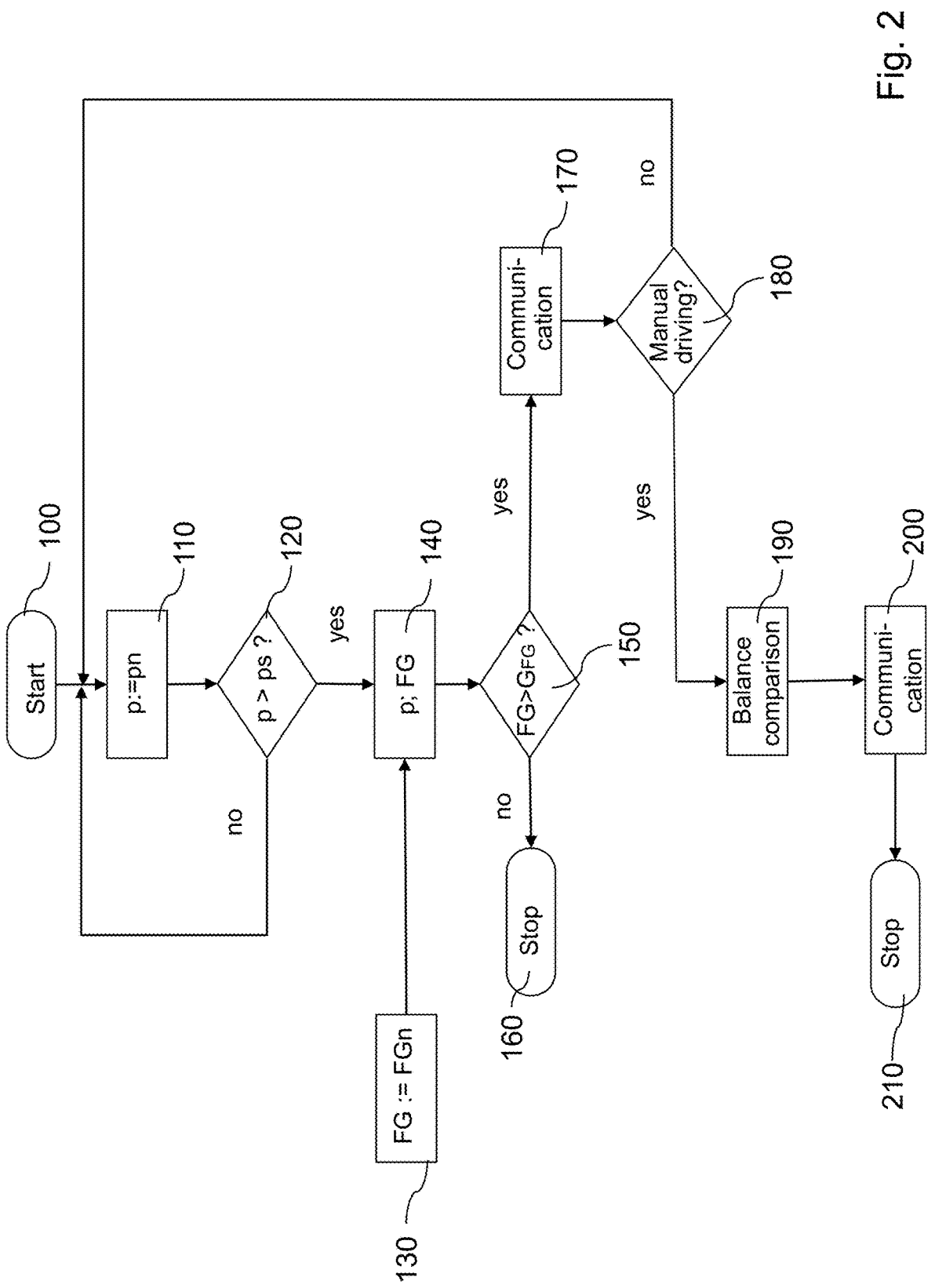

Here:

FIG. 1 shows an exemplary embodiment for an automated vehicle having the device according to the invention, FIG. 2 shows an exemplary embodiment of the method according to the invention.

DETAILED DESCRIPTION

In FIG. 1, an automated vehicle 1 having the device 3 according to the invention is depicted. The device 3 is designed as a vehicle assistant and comprises a monitoring module 5, in which a model 7 for predicting a driver's intention to end automated driving of the vehicle 1 via manual vehicle control is stored. This monitoring module 5 is coupled with an action module 9, which, in the event of a predicted takeover by the driver when conditions for automated driving are met, outputs information to the driver, which informs the driver that automated driving is reliably in control of the driving situation. In order to output this information, the action module 9 is connected to a display unit 11 for displaying information as function graphics or text and connected to a loudspeaker 13 for speech output. In order to check whether the conditions for automated driving are met by the vehicle 1, a module 15 is equipped to monitor the conditions for automated driving, which is likewise fed to the action module 9. The action module 9, the module 15 and the monitoring module 5 are standalone control devices or integrated into a control device.

The monitoring module 5 continuously determines the condition, the awareness, and the behavior of the driver by means of sensors 17, such as cameras, steering sensors, biometric sensors of the vehicle 1, and outputs the aforementioned to the model 7. Simultaneously, traffic data, weather, the course of the road, the driving situation, time of day etc., are supplied to the model 7. With all of this data, the model 7 is continuously trained to predict a point in time or a characteristic of a manual takeover of the driving mode carried out independently by the driver, i.e., without prompting by the vehicle, which corresponds to automated driving being ended. The model 7 uses statistical methods or methods for machine learning. It can advantageously be designed as a neural network. The model 7 is integrated in a dedicated control device or a control device having at least one of the previously specified modules.

By means of the model 15 for monitoring automated driving, the conditions required for automated driving are checked for their functional quality. By means of further sensors 19, the environment of the vehicle 1 is, for example, observed with regard to traffic participants, obstacles, crossings, etc. The action module 9 determines the current functional quality of automated driving from the monitoring and compares the functional quality with a limit value. If the determined functional quality falls short of the limit value, a takeover request to initiate the manual driving mode is automatically output to the driver via the action module 9, because automated driving is no longer safe.

Because the data from the monitoring module 5 and the module 15 is combined in the action module 9 to monitor automated driving, the latter controls the actuators necessary for communication with the vehicle driver and compares manual driving maneuvers with simulated (partially) automated driving maneuvers. The information is output to the driver a pre-determined period of time before the predicted time of the takeover. The period of time is determined depending on the difference between the determined functional quality and the limit value, i.e., the smaller the difference of the functional quality from the limit value, the shorter the period of time before which the information is output. It can thus be ensured that the functional quality of automated driving remains above the limit value at the time of the predicted takeover, and the safety of driving is thus always guaranteed.

If the driver is predicted to manually take over the driving mode without prompting by the vehicle 1 and when conditions for automated driving are met, i.e., when a functional quality lies above the limit value, the action module 9 outputs information to the user about what driving mode data of hypothetical automated driving without a manual takeover would have looked like. The length of road still to be driven in an automated manner without manual intervention can also be part of this information, as well as a measure for an increase in safety if automated driving is continued in comparison with manual driving. A detected short manually effected distance to the vehicle ahead, speeding, distraction etc., can be used for this purpose.

In addition, the monitoring module 5 is wirelessly connected to a vehicle-external server 21, such as an OEM data center or a cloud application, which communicates with a plurality of vehicles of a fleet. The monitoring module 5 of each vehicle 1 transmits the data processed by the respective model 7 and the results of the prediction to the vehicle-external server 21. The vehicle-external server 21 classifies the driver of the fleet using this data. These drivers can be rated as sporty, anxious, or safety-conscious. With reference to the classification, different models 7 are trained, which are suitable for predicting the takeover for a driver of a classified driver type.

The feedback from the monitoring module 5 to the vehicle-external server 21 can be used to correct, optimize, or adjust the regulation of automated driving. In particular, the predictive feature values, which are the basis of the model 7 used, can be extracted for this purpose. Groups of similar automated driving usage behavior can further be extracted from the individual models 7 of the vehicles 1 of a fleet. This enables the development of group-specific variants of automated driving.

In FIG. 2, an exemplary embodiment of the method according to the invention is represented. During automated driving, the method stored in the vehicle assistant (device 1) is started in block 100. In block 110, the monitoring module 5 determines a probability p of a manual takeover of the driving operation by the driver. If a high probability p (exceeding a probability threshold value $p_s$ in block 120), and thus an imminent manual takeover by the driver is determined, a corresponding signal is sent to the action module 9. The module 15 for monitoring automated driving simultaneously determines the environment data, and uses this to determine the functional quality FG of the automated driving, which is also transmitted to the action module 9 in block 140. In block 150, the functional quality FG is compared with the limit value $G_{FG}$. If it is determined in block 150 that the functional quality FG lies below the limit value $G_{FG}$, a takeover request for manual vehicle control is automatically triggered in block 160, or automated driving is ended in order to prevent a system failure of the latter.

If the functional quality FG exceeds the limit value $G_{FG}$, the communication with the vehicle driver is started in block 170 by the action module 9. A suitable communication path is selected to instruct the driver about the performance capability of automated driving. An alert symbol, for example a green light, an icon in the display instrument 13 or the like can thus be used, which is also additionally supported by text information. In addition, or as an alternative, the driving behavior of the automated driving can be adjusted, for example by reducing the speed or a greater safe distance from a vehicle ahead, in order to reduce the probability p that the driver intends a manual takeover of the vehicle operation.

In block 180, it is checked whether a manual driving mode has been initiated. If this is not the case, block 110 is returned to. In a manual takeover, in block 190 the action module 9 calculates how the energy, traffic flow, and safety balance of the current manual takeover differs from hypothetically continued automated driving (shadow mode). In block 200, the driver can thus be informed of what driving performance during automated driving would have been like. This information can also be used in the future to decide whether a communication to the driver is started due to a predicted manual takeover intention, if, for example, the difference between automated driving and the manual takeover is too small with regard to the energy, traffic flow, and safety balance. This information can further be used if the probability p, which is determined in the monitoring module 5, is too high, such that a manual takeover, even by means of communication, is unavoidable. The method is then ended in block 210.

The vehicle assistant's manner of working will be explained in more detail with reference to the following application. In the application, automated driving is regularly deactivated by an individual driver on the motorway before exits. The times ti of the respective requests for the driver to transition from the vehicle assistant controlling automated driving to manual control are recorded. In addition, the feature values both in the monitoring module 5 and in the module 15 for monitoring automated driving at the times ti and a period of time tn–i before each time ti are stored. In the model 7, the recorded feature values are linked to a high probability p of the transition request during the training. Here, for example, the model 7 learns that the motorway driving mode and geolocation shortly before an exit make a manual transition request likely. If the vehicle 1 with the individual driver is on the motorway shortly before an exit, the action unit 9 now informs the driver before the vehicle assistant sends the information that a manual takeover is not required. This takes place at a time before the driver themselves consciously makes the decision to make a manual transition request. In addition, in this driving situation with predicted manual takeover, the vehicle can test different variants of the driving behavior of the vehicle 1, for example by selecting a larger or smaller safe distance from the vehicle ahead, or the middle or left lane on the motorway, or by transmitting an additional communication to the environment, e.g., to vehicle participants moving in the vehicle environment. If the driver behavior varies, no information is preferably output to the driver, so that it can be observed whether the variant still leads to a manual takeover or whether this can be successfully avoided. If one variant successfully leads to a manual takeover being avoided, the variant is added to the driving profile of the driving assistant. Consequently, the model learns that a manual takeover is unlikely in this modified manner of driving, whereby a prediction of a manual takeover and associated steps do not take place in the driving situation in this manner of driving.

Such a variation in driving behavior of the vehicle 1 can be pre-defined in the vehicle assistant or be exploratively learned by the system within pre-defined limits.

Although the invention has been illustrated and described in detail by way of preferred embodiments, the invention is not limited by the examples disclosed, and other variations can be derived from these by the person skilled in the art without leaving the scope of the invention. It is therefore clear that there is a plurality of possible variations. It is also clear that embodiments stated by way of example are only really examples that are not to be seen as limiting the scope, application possibilities or configuration of the invention in any way. In fact, the preceding description and the description of the figures enable the person skilled in the art to implement the exemplary embodiments in concrete manner, wherein, with the knowledge of the disclosed inventive concept, the person skilled in the art is able to undertake various changes, for example, with regard to the functioning or arrangement of individual elements stated in an exemplary embodiment without leaving the scope of the invention, which is defined by the claims and their legal equivalents, such as further explanations in the description.

The invention claimed is:

1. A method for increasing a share of automated driving in an at least partially automated vehicle, the method comprising:

during a first period of time

A. monitoring, by the at least partially automated vehicle, conditions of the automated driving of the at least partially automated vehicle, wherein the conditions of the automated driving comprise behavior of the at least partially automated vehicle, driving situations, and environmental conditions;

B. monitoring, using sensors of the at least partially automated vehicle, at least awareness and behavior of a driver of the at least partially automated vehicle;

C. determining, by the at least partially automated vehicle based on the monitored conditions, that conditions for at least partially automated driving are met;

D. training a model with the monitored conditions and the monitored at least awareness and behavior of the driver as input parameters;

E. predicting, by the at least partially automated vehicle using the trained model and responsive to the determination that the conditions for the automated driving are met, that the automated driving will be ended by manual vehicle control;

F. outputting, by the at least partially automated vehicle and responsive to predicting that a takeover by the driver may occur, information to the driver informing the driver that the automated driving is reliably in control of a driving situation of the at least partially automated vehicle;

G. adjusting, by the at least partially automated vehicle and responsive to predicting that a manual takeover by the driver may occur, at least one of speed or distance of the at least partially automated vehicle;

H. determining, by the at least partially automated vehicle, whether or not the driver attempted to the manual takeover of the at least partially automated vehicle; and G. updating the trained model with the adjustment of the at least one of the speed or the distance of the at least partially automated vehicle and whether or not the driver attempted to the manual takeover of the at least partially automated vehicle; and repeating A.-G. during a second period of time subsequent to the first period of time.

2. The method of claim 1, wherein a functional quality of the automated driving is determined by monitoring the conditions for the automated driving.

3. The method of claim 2, wherein when the manual vehicle takeover without prompting occurs and when conditions for the automated driving are met by the functional quality being above a predetermined limit value, the driver is informed of what driving operating data of hypothetical automated driving would have looked like without the manual vehicle takeover.

4. The method of claim 1, wherein the model is stored on a central server and is trained with data of a vehicle fleet.

5. The method of claim 1, wherein the information is output to the driver via function graphics, a voice output, or text output.

6. The method of claim 4, wherein driving parameters of the at least partially automated vehicle are determined to be effective for reducing takeover frequency and are transmitted to other vehicles via the central server.

7. The method of claim 4, wherein the sensors further monitor a condition of the driver and the condition of the driver is also used to train the model.

* * * * *